Figure 2:
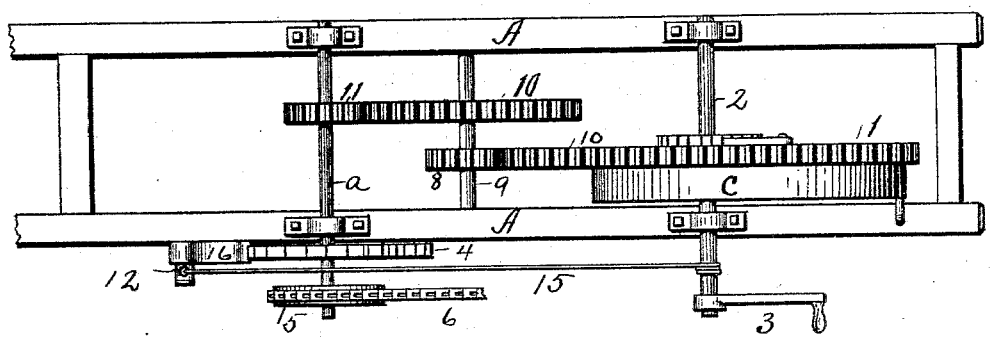

(No Model.)  2 Sheets—Sheet 1.
J. E. HART.
GOVERNOR FOR MECHANICAL MOTORS.
No. 490,249. Patented Jan. 17, 1893.
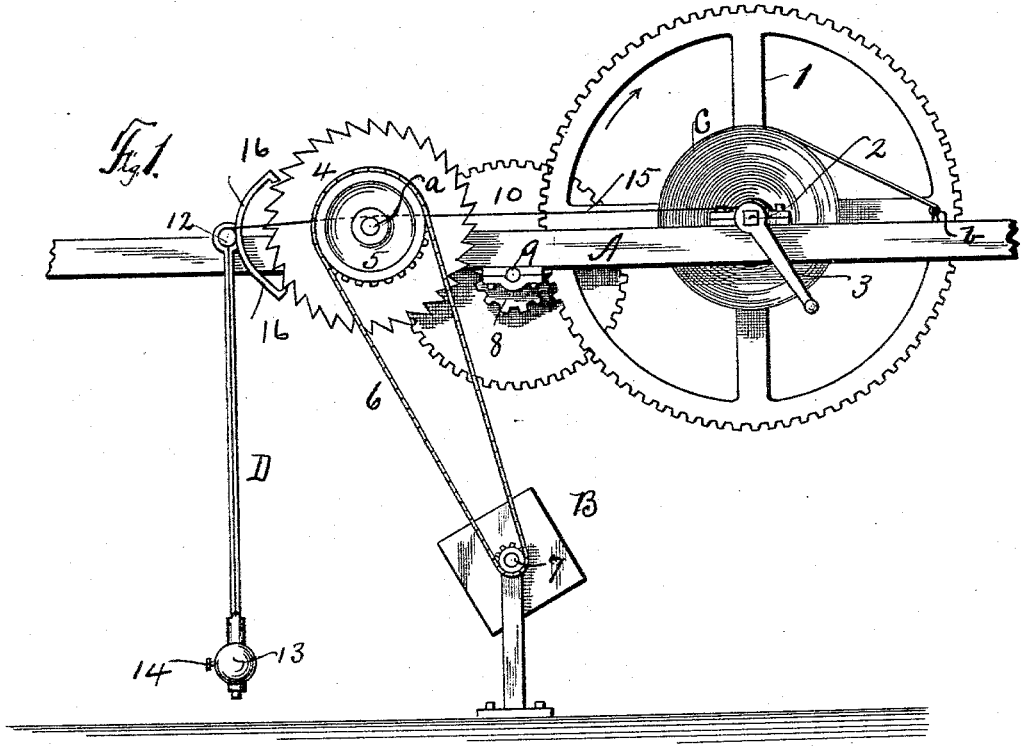
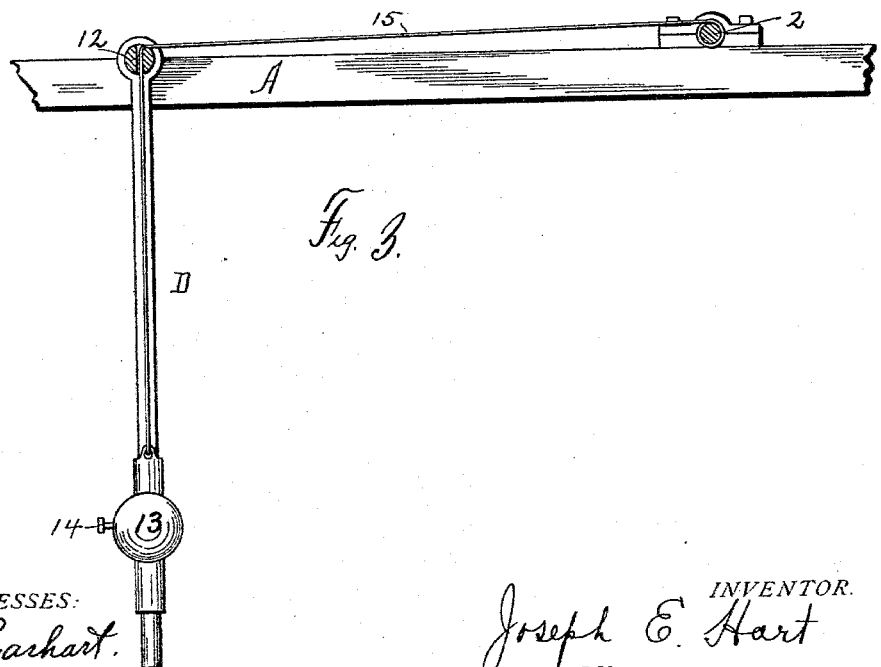
WITNESSES:
H. A. Carhart.
C. B. Kinne
INVENTOR.
Joseph E. Hart
BY
Smith & Denison
ATTORNEYS (No Model.) 2 Sheets—Sheet 2.

J. E. HART.
GOVERNOR FOR MECHANICAL MOTORS.

No. 490,249. Patented Jan. 17, 1893.

WITNESSES:
H. A. Carhart
Geo. H. Blivers

INVENTOR.
Joseph E. Hart.
BY
Smith & Denison
ATTORNEYS

UNITED STATES PATENT OFFICE.

JOSEPH E. HART, OF FOWLER, INDIANA, ASSIGNOR OF ONE-HALF TO JESSE HOLLINGSWORTH, OF SAME PLACE.

GOVERNOR FOR MECHANICAL MOTORS.

SPECIFICATION forming part of Letters Patent No. 490,249, dated January 17, 1893.

Application filed July 9, 1892. Serial No. 439,540. (No model.)

*To all whom it may concern:*

Be it known that I, JOSEPH E. HART, of Fowler, in the county of Benton, in the State of Indiana, have invented new and useful Improvements in Governors, of which the following, taken in connection with the accompanying drawings, is a full, clear, and exact description.

My invention relates to the construction and operation of motors adapted for use in running churns or other devices where only light power is required; and particularly to the governor which regulates the speed thereof.

My object is to produce a motor provided with a device for governing its motion; cheap, durable in construction and of great utility.

My invention consists in the several novel features of construction and operation hereinafter described and which are specifically set forth in the claims hereto annexed. It is constructed as follows, reference being had to the accompanying drawings, in which Figure 1, is a side view of the motor and governor, complete, geared to and rotating the churn. Fig. 2, is a top plan view thereof. Fig. 3, is an enlarged detail of the governor.

A—A—, are the frame bars upon which the motor is mounted and —1— is a cog wheel mounted upon an axle —2— which is provided at one end with a crank arm —3— for the purpose of rotating it when it is desired to wind up the spring.

4—, is an escapement wheel mounted upon a shaft —a—, as shown, and concentric with it, mounted upon the same shaft is the sprocket wheel —5—.

6—, is a sprocket chain connecting it with a sprocket wheel —7— upon the shaft upon which the churn —B— is mounted.

8—, is a small cog wheel mounted upon the shaft —9— between the wheels —1— and —4—, and at one side of said wheel —8— upon the shaft —9— is the cog wheel —10— rigidly secured thereto so that it will rotate simultaneously with the wheel —8—; and —11— is a cog wheel mounted upon the shaft —a— and concentric with the wheels —4— and —5— and adapted to engage with the wheel —10—.

C—, is a main spring mounted upon the shaft —2— and having its free end secured to the frame at —b—, said spring serving to impart power to the wheel —1—, when wound up, and the wheel —1— engaging with the wheel —8—, wheels —8— and —10— being concentric, wheel —10— engaging with wheel —11—, whence power is imparted to the sprocket wheel —5—, and thence to the churn or other device, desired to be driven.

D—, is a governing pendulum hung and adapted to rotate at —12—; and —13— is a weight slidingly mounted upon the pendulum where it may be secured in any desired position by the set screw —14—.

15—, is a belt secured at one end upon the shaft —2— and adapted to be wound by it with the forward movement of the shaft —2— caused by the power of the spring, the belt passing over a bar, pulley or idler at the point where the pendulum is hung, and its opposite end is secured to the weight —13— upon the pendulum. The pendulum is provided with ordinary escapement arms —16— adapted to engage with the escapement wheel —4— in the ordinary way. It will be observed that as the spring spends its force and rotates the wheel —1— and shaft —2—, the belt —15— will be wound upon the shaft —2—, thereby causing the weight —13— to continually rise upon the pendulum so that when the spring is exerting its weakest force, the weight will be getting higher and higher at each rotation, and thereby cause less power to vibrate the pendulum. By this it will be observed that a uniform speed will at all times be maintained. I preferably construct the pendulum —D—, hollow and allow the belt to pass down within it, but I do not limit myself to this construction as it will be very evident that the pendulum may be a small rod and the belt pass at one side of it.

Having described my invention, what I claim is:

1. The combination with the motor, of the pendulum having escapement arms adapted to engage with the escapement wheel, a weight slidingly mounted upon said pendulum, and a belt connected at one end to the weight and having its opposite end adapted to be wound by the operation of the motor.

2. The combination with the motor having escapement arms adapted to engage with the escapement wheel, the sliding weight upon said pendulum, means for securing the weight to the pendulum, a belt connected at one end to the weight and adapted to be wound at its opposite end by the operation of the motor, as set forth.

In witness whereof I have hereunto set my hand this 14th day of June, 1892.

JOSEPH E. HART.

In presence of—
C. M. SNYDER,
HOWARD P. DENISON.